Jan. 11, 1955
I. S. WINGFIELD
2,699,177
AUTOMATIC GAS CUTOFF VALVE
Filed Feb. 19, 1952
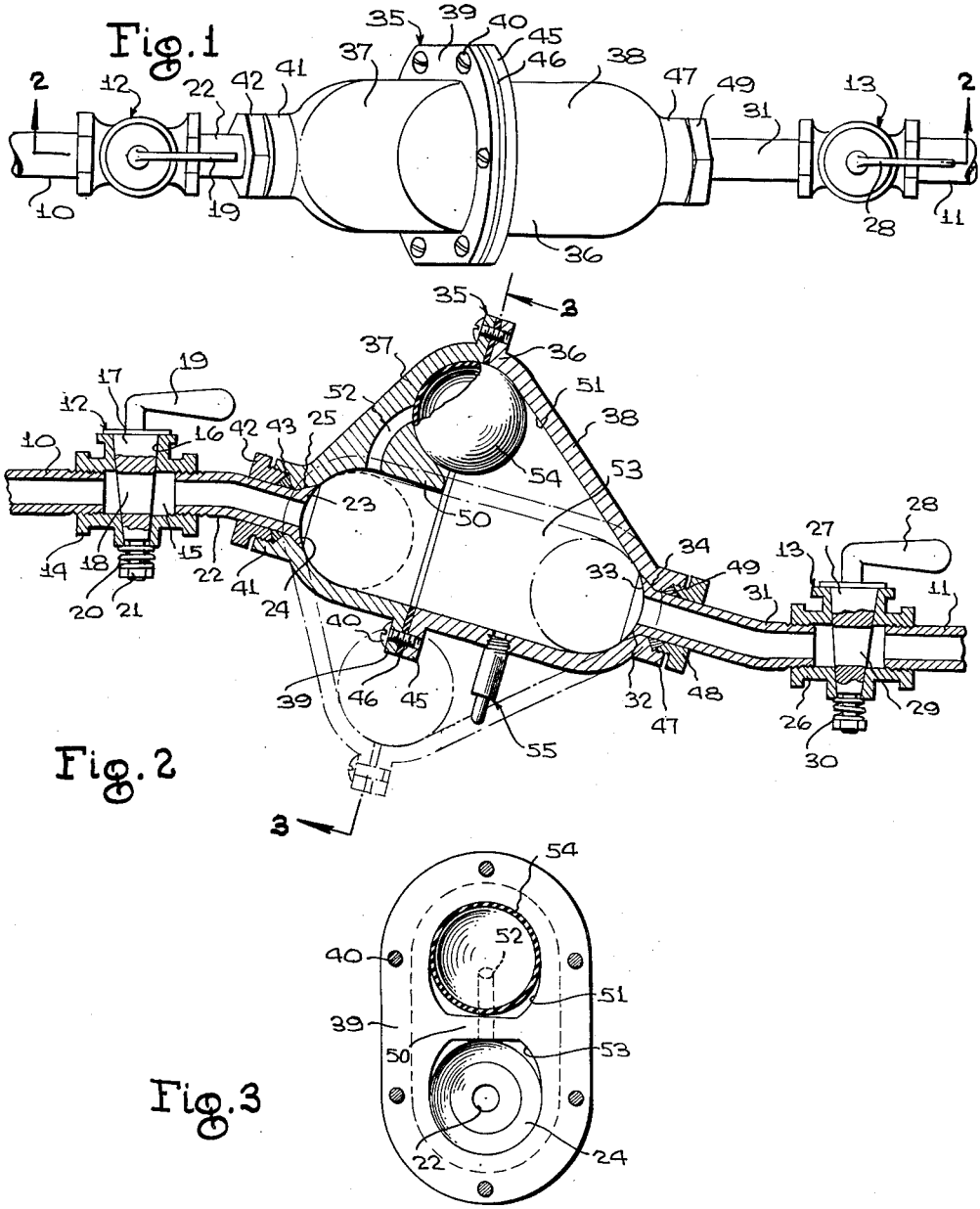
INVENTOR.
Isaac S. Wingfield
BY
McMorrow, Berman + Davidson
ATTORNEYS

United States Patent Office 2,699,177
Patented Jan. 11, 1955

2,699,177

AUTOMATIC GAS CUTOFF VALVE

Isaac S. Wingfield, Little Rock, Ark.

Application February 19, 1952, Serial No. 272,355

4 Claims. (Cl. 137—466)

This invention relates to automatic cut off valves for gas lines and more particularly to a valve which will automatically close the line when the gas pressure is interrupted and maintain the line closed until the valve is manually reset.

It is among the objects of the invention to provide an improved automatic cut off valve which can be easily coupled into a gas line and will automatically shut off the line if the gas pressure fails and maintain the line shut off until the gas pressure is restored and the valve manually reset; which can be reset by rotating the valve about the center line of the gas line to an inverted position and returning it to upright position; which remains in open condition as long as the pressure in the gas line is maintained; and which is simple and durable in construction, economical to manufacture, easy to install, and positive and effective in operation.

Other objects and advantages will become apparent from a consideration of the following description and the appended claims in conjunction with the accompanying drawing wherein:

Figure 1 is a top plan view of a cut off valve assembly illustrative of the invention;

Figure 2 is a cross sectional view on the line 2—2 of Figure 1; and

Figure 3 is a cross sectional view on the line 3—3 of Figure 2.

With continued reference to the drawing, the automatic cut off valve assembly is shown interposed in a gas line represented by the pipe sections 10 and 11 disposed, one at each end of the assembly, the pipe 11 being the inlet pipe to the assembly, and the pipe 10 the outlet pipe from the assembly to an appliance, such as a gas stove, furnace, or hot water heater.

A manually operated cut off valve, generally indicated at 12, and of well known construction, is connected at one end to the end of the pipe section 10 and a similar manually operated cut off valve, generally indicated at 13, is connected at one end to the end of the pipe section 11.

As is particularly illustrated in Figure 2, the valve 12 comprises a housing 14 having a passage 15 extending longitudinally therethrough and a tapered bore 16 extending transversely therethrough and intersecting the passage 15. A tapered plug 17 is rotatably mounted in the bore 16 and has a transversely extending passage 18 therein disposed in the passage 15 and a handle 19 extending substantially perpendicularly from its larger end. The plug 17 is seated in the bore by a compression spring 20 which surrounds an extension at the smaller end of the plug and bears at one end against the outer end of a boss on the valve housing at the smaller end of the bore 16, a nut 21 being threaded onto the plug extension and bearing against the other end of the spring. The housing 14 is internally screw threaded at each end of the passage 15 and the pipe section 10 has an externally screw threaded end portion threaded into the housing at one end of the longitudinal passage while a pipe nipple 22 is threaded at one end into the other end of the valve housing 14. The pipe nipple 22 has a slight bend intermediate the length thereof and is flared at its end remote from the valve 12 to provide an external annular flange 23 the end surface of which is formed to provide a partly spherical valve seat 24 and the other surface of which is beveled to provide a partly conical bearing surface 25.

The valve 13 also has a housing 26 provided with a longitudinally extending passage and a transverse tapered bore intercepting the longitudinally extending passage, a tapered plug 27 rotatably received in the bore and provided with a handle 28 and a transverse passage 29, and a compression spring 30 maintaining the plug closely seated in the bore of the housing. The housing 26 is internally screw threaded at each end of the passage extending longitudinally therethrough and the pipe 11 is threaded into one end of this housing. A pipe nipple 31 is threaded into the other end of the housing 26 and has at its end remote from the valve 13 and external annular flange 32 the surface of which remote from the cut off valve 13 is shaped to provide a partly spherical valve seat 33 and the surface of which adjacent the valve 13 is shaped to provide a partly conical bearing surface 34.

An automatic cut off valve, generally indicated at 35, is disposed between the pipe nipples 22 and 31 and comprises a two-part housing 36, the two separable parts of which are designated at 37 and 38.

The housing parts 37 and 38 are somewhat bell-shaped and of generally rectangular cross sectional shape, each having two sides which are opposed and substantially parallel to each other, a third side which is substantially parallel to the longitudinal center line of the housing and a fourth side which is disposed at an angle to the third side to provide an extension of somewhat triangular cross sectional shape, as viewed in Figure 2, at one side of the housing. The housing part 37 is provided at its larger, open end with an external flange 39 having spaced apart apertures therein receiving screws 40, and is provided at its smaller end with a hollow, cylindrical boss 41 which is counterbored and internally screw threaded at its outer end. The pipe nipple 22 extends through the boss 41 and has its partly conical bearing surface 25 in bearing engagement with a corresponding surface at the inner end of the boss 41 and a flanged nut 42 is threaded into the outer end of the boss 41, packing material 43 being disposed between the inner end of the gland nut and the inner end of the counterbore in the boss 41 to provide a fluid tight seal between the housing part 37 and the pipe nipple 22 while permitting rotation of the housing part 37 about the corresponding pipe nipple.

The housing part 38 is provided at its larger, open end with an external flange 45 having spaced apart screw threaded apertures also receiving the screws 40 which secure the two parts of the housing together in operative assembly, a gasket 46 being interposed between the opposed surfaces of the flanges 39 and 45 to provide a fluid tight seal between the two parts of the housing.

At its smaller end the housing part 38 is provided with a hollow, cylindrical boss 47 which is counterbored and internally screw threaded at its outer end. The pipe nipple 31 extends through the boss 47 and the bearing surface 34 on this pipe nipple engages a complementary bearing surface at the inner end of the boss 47. A gland nut 48 surrounds the pipe nipple 31 and is threaded into the outer end of the boss 47, packing material 49 being interposed between the inner end of the nut 48 and the inner end of the counterbore in the boss 47 to provide a fluid tight seal between the housing part 38 and the pipe nipple 31 while providing freedom of rotational movement of the housing part 38 about the pipe nipple 31. It will be noted that the portions of the pipe nipples 22 and 31 received in the housing parts 37 and 38 have a common center line which is coincident with the longitudinal center line of the housing and that these pipe nipples with the associated packing glands constitute rotatable unions so that the housing can be rotated about the pipe nipples between an upright and an inverted position.

A partition 50 is provided internally of the housing part 37 between the main portion of the housing and the housing extension and this partition provides in the laterally extending portion of the housing a pocket 51 having an end of hemispherical shape in the housing part 37. A passage 52 extends through the partition 50 from the hemispherically shaped or closed end of the pocket 51 to the side of the partition remote from the pocket and at a location adjacent the boss 41 on the housing part 37.

In addition to the pocket 51, the housing provides internally thereof a chamber 53 of elongated, tubular shape, the ends of which are constituted by the valve seat surfaces 24 and 33 on the inner ends of the pipe nipples 22 and 31 respectively, and the pocket 51 opens into the chamber 53 at the inner edge of the partition 50, as is clearly illustrated in Figure 2.

A hollow spherical ball 54 of light weight construction is disposed in the housing 36 and has a diameter such that it fits closely into the hemispherically shaped closed end of the pocket 51 and fits the partly spherical valve seat surfaces 24 and 33 on the inner ends of the pipe nipples.

A vent valve, generally indicated at 55, is threaded at one end into a tapped hole in the wall of the housing 36 and projects outwardly from the housing for venting the gas pressure from the interior of the housing.

In the use of the device, the housing 38 normally stands in upright position, as illustrated in Figure 2, with the ball 54 at the closed end of the pocket 51 and disposed above the chamber 53. The pressure of the gas in the housing holds the ball in the upper, closed end of the pocket 51, the passage 52 venting the inner end of the pocket at the outlet end of the cut off valve housing and assisting in maintaining the ball in the pocket as long as gas pressure in the gas line and in the cut off valve housing is not interrupted. Under these conditions, if the pressure in the gas line fails, the ball will drop from the pocket 51 into the chamber 53 and, as the chamber 53 is inclined downwardly from the outlet to the inlet end of the housing 36, the ball will roll into seating engagement with the valve seat formation on the end of the pipe nipple 31 disposed within the housing 36, thereby preventing leakage of air into the gas line in the event the control valve of the associated appliance or appliances is open at the time. As soon as gas pressure is restored in the line at the inlet end of the automatic cut off valve, the gas pressure will move the ball from the end of the pipe nipple 31 within the housing 36 into engagement with the end of the pipe nipple 22 within the automatic cut off valve housing, thereby preventing a flow of gas to the associated appliance. It is now necessary to reset the automatic cut off valve and relight the appliance. In order to reset the automatic cut off valve, the manually operated valves 12 and 13 are both closed. The housing 36 is then rotated about the pipe nipples 22 and 31 until the pocket 51 is disposed below the pipe nipples. The vent valve 55 is then manually opened to relieve the trapped gas pressure in the housing and the ball will then fall into the pocket 51. The valve 13 is then opened, restoring gas pressure to the interior of the automatic cut off valve housing, and the valve 12 is opened and the appliance relighted. The automatic cut off valve housing 36 is then manually rotated back to its upright position in which the pocket 51 is disposed above the chamber 53 and the pipe nipples 22 and 31, the restored gas pressure in the housing 36 holding the valve in the upper closed end portion of the pocket and out of engagement with the inner ends of the pipe nipples.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a gas line conduit, manually operated cut off valves connected into said conduit at spaced apart locations, pipe nipples projecting one from each of said manually operated cut off valves toward the other, and an automatic cut off valve disposed between said manually operated cut off valves and comprising an elongated hollow housing having packing glands disposed one at each end thereof and rotatably receiving said pipe nipples, said pipe nipples being formed at their ends disposed inwardly of said housing to provide ball valve seats one at each end of the housing, a valve ball in said housing movable longitudinally of the latter from one of said valve ball seats to the other and held in engagement with one of said valve ball seats by gas pressure in said housing, said housing having a lateral extension on one side thereof, a partition in said housing providing a ball receiving pocket between itself and the outer side of said housing and at the end of said housing at which said one valve seat is located, said partition having a channel therethrough connecting said pocket with the space in said housing adjacent said one valve seat, and a manually operated vent valve connected into said housing and projecting therefrom, said housing being normally disposed with said extension at the upper side thereof and said valve ball retained in said pocket by gas pressure in said housing and away from said valve seats, said ball falling from said pocket upon failure of said gas pressure in said housing and being moved into engagement with the valve seat at the outlet end of said housing upon restoration of gas pressure, and said ball being returned to said pocket by closing the manually operated cut off valve at the inlet end of said housing, inverting said housing and momentarily opening said vent valve, said manually operated cut off valve being then opened and said housing returned to normal upright position with said ball retained in said pocket by gas pressure in said housing.

2. An automatic gas cut off valve assembly comprising manually operated cut off valves disposed in spaced apart relationship, pipe nipples extending one from each manually operated cut off valve toward the other and having a common center line, and an automatic cut off valve disposed between said manually operated cut off valves and comprising a hollow housing having packing gland assemblies disposed one at each end thereof and respectively receiving said pipe nipples for rotation of said housing about the common center line of said pipe nipples, said pipe nipples providing partly spherical valve ball seats within said housing one at each end of the latter and said housing providing a chamber extending between said valve seats and a pocket opening at one end into said chamber and inclined outwardly from the latter, a hollow ball valve in said housing, said pocket being normally disposed above said chamber and said valve ball being normally retained in said pocket by gas pressure in said chamber but free to fall from said pocket into said chamber to engage one or the other of said valve seats upon failure of gas pressure in said chamber, and being returned to said pocket by rotation of said housing to inverted position about the common center line of said pipe nipples, said chamber being inclined downwardly from the outlet to the inlet end of said housing when the latter is in normal upright position so that upon failure of gas pressure in said chamber said ball will move into engagement with the valve seat at the inlet end of said housing and upon restoration of gas pressure in said chamber said ball will move into engagement with the valve seat at the outlet end of said housing, and a manually operated vent valve mounted on said housing and communicating with the interior thereof to relieve gas pressure in said chamber and free said ball valve to drop from said chamber into said pocket when said housing has been inverted and the manually operated cut off valve at the inlet end of said housing closed after restoration of gas pressure to said chamber.

3. An automatic gas cut off valve assembly comprising pipe nipples disposed in spaced apart relationship and having a common center line, a manually operated cut off valve connected to one of said nipples at the end of said one pipe nipple remote from the other pipe nipple, and an automatic cut off valve disposed between said pipe nipples and comprising a hollow housing having packing gland assemblies one at each end thereof and respectively receiving said pipe nipples for rotation of said housing about the common center line of the latter, said manually operated cut off valve being connected to the pipe nipple on the inlet side of said automatic cut off valve, said pipe nipples providing valve ball seats within said housing one at each end of the latter and said housing providing a chamber extending between said valve seats and a pocket opening at one end into said chamber and inclined outwardly from the latter, a hollow ball valve in said housing, said pocket being normally disposed above said chamber and said valve ball being normally retained in said pocket by gas pressure in said chamber but free to fall from said pocket into said chamber to engage one or the other of said valve seats upon failure of gas pressure in said chamber and being returned to said pocket by rotation of said housing about the common center line of said pipe nipples to an inverted position, and a manually operated vent valve mounted on said housing and communicating with the interior to relieve gas pressure in said chamber and free said ball valve to drop from said chamber into said pocket when said housing has been inverted and the manually operated cut off valve at the inlet end of said housing closed after restoration of gas pressure to said chamber.

4. An automatic gas cut off valve assembly comprising manually operated cut off valves disposed in spaced apart relationship and an automatic cut off valve disposed between said manually operated cut off valves and comprising a hollow housing, rotatable unions connecting said manually operated cut off valves to the respectively opposite ends of said housing for rotation of said housing about the common center line of said unions, said housing providing a chamber extending between said rotatable unions and a pocket opening at one end into said chamber and inclined outwardly from the chamber, valve seats disposed one at each end of said chamber, a hollow ball valve in said housing, said pocket being normally disposed above said chamber and said ball valve being normally retained in said pocket by gas pressure in said chamber but free to fall from said pocket into said chamber to engage one or the other of said valve seats upon failure of gas pressure in said chamber, and being returned to said pocket by rotation of said housing to inverted position, and a vent valve in said housing communicating with said chamber to vent gas pressure from said chamber when said manual cut off valves are closed and said housing inverted to thereby free said ball valve to move away from the associated valve seat and into said pocket.

References Cited in the file of this patent

UNITED STATES PATENTS

| | | |
|---|---|---|
| 787,195 | Leadbeater | Apr. 11, 1905 |
| 971,295 | Menear et al. | Sept. 27, 1910 |
| 1,013,695 | Storer et al. | Jan. 2, 1912 |
| 1,458,087 | Tooley et al. | June 5, 1923 |

FOREIGN PATENTS

| | | |
|---|---|---|
| 11,933 | Sweden | Jan. 26, 1901 |